(12) United States Patent
Bacallao et al.

(10) Patent No.: US 10,185,962 B2
(45) Date of Patent: Jan. 22, 2019

(54) STORE ITEM RETURN PROCESS

(71) Applicant: Walmart Apollo, LLC, Bentonville, AR (US)

(72) Inventors: Yurgis Mauro Bacallao, Centerton, AR (US); Douglas E. Humphrys, Bentonville, AR (US); Tina Kurtz, Rogers, AR (US); Leslie Irvin, Gravette, AR (US)

(73) Assignee: WALMART APOLLO, LLC, Bentonville, AR (US)

( * ) Notice: Subject to any disclaimer, the term of this patent is extended or adjusted under 35 U.S.C. 154(b) by 16 days.

(21) Appl. No.: 15/451,562

(22) Filed: Mar. 7, 2017

(65) Prior Publication Data

US 2017/0260010 A1 Sep. 14, 2017

Related U.S. Application Data

(60) Provisional application No. 62/305,107, filed on Mar. 8, 2016.

(51) Int. Cl.
*G06F 19/00* (2018.01)
*G06Q 20/40* (2012.01)
*G06K 19/077* (2006.01)
*G06K 7/14* (2006.01)
*G06K 19/06* (2006.01)

(52) U.S. Cl.
CPC ......... *G06Q 20/407* (2013.01); *G06K 7/1413* (2013.01); *G06K 19/06028* (2013.01); *G06K 19/07758* (2013.01)

(58) Field of Classification Search
CPC .. G06Q 10/08; G06Q 10/087; G06Q 10/0837; B65G 13/00; B65G 13/02; B65G 13/04; B65G 13/06; B65G 15/00; B65G 15/22; B65G 15/24; B65G 15/28; B65G 15/30; B65G 47/00; B65G 47/42;
(Continued)

(56) References Cited

U.S. PATENT DOCUMENTS 4,248,389 A 2/1981 Thompson et al.
5,220,511 A 6/1993 Speckhart et al.
(Continued)

OTHER PUBLICATIONS

Pop, Corina and Gabriela Mailat "Automated Material Handling Systems (AMHS) in libraries and archives: Automated Storage/retrieval and Return/sorting systems," Proceedings of the 12th WSEAS international conference on Neural networks, fuzzy systems, evolutionary computing & automation, Apr. 11-13, 2011, pp. 189-194, Romania.
(Continued)

*Primary Examiner* — Thien M Le
*Assistant Examiner* — April Taylor
(74) *Attorney, Agent, or Firm* — Schmeiser, Olsen & Watts LLP

(57) ABSTRACT

A system for transporting merchandise returned by a customer from a customer service area or a retail store to a back storage area of a retail store comprises a customer facing device for use by a retail store customer to enter return merchandise data; a scanning device for identifying the returned merchandise; and at least one conveyor belt at the retail store for transporting the returned merchandise from the customer service area to the back storage area.

15 Claims, 4 Drawing Sheets

(58) Field of Classification Search
CPC ........ B65G 47/46; B65G 47/49; B65G 47/68; B65G 2203/0216
See application file for complete search history.

(56) References Cited

U.S. PATENT DOCUMENTS

| | | | | |
|---|---|---|---|---|
| 5,687,850 | A * | 11/1997 | Speckhart | B07C 5/3412 209/2 |
| 5,770,848 | A * | 6/1998 | Oizumi | G06K 7/10831 235/383 |
| 5,813,543 | A * | 9/1998 | Gesing | B07C 5/34 209/577 |
| 6,536,659 | B1 * | 3/2003 | Hauser | G06Q 30/06 235/375 |
| 6,704,690 | B2 * | 3/2004 | Koh | G06K 17/0022 340/572.1 |
| 6,962,291 | B2 | 11/2005 | Guntveit et al. | |
| 7,530,447 | B2 * | 5/2009 | Fritsche | B07C 1/04 198/644 |
| 2001/0042055 | A1 * | 11/2001 | Didriksen | G07B 17/00193 705/407 |
| 2009/0144208 | A1 * | 6/2009 | Blust | G06Q 10/08 705/500 |
| 2017/0057748 | A1 * | 3/2017 | Hoynash | B65G 17/345 |

OTHER PUBLICATIONS

Tuohy, Greg "Conveyer and Sortation Systems in a Cold Room Environment," LinkedIn.com, Oct. 27, 2015; 7 pages.

"Returns Logistics Centre: HamBurg," Hermesworld.com, Oct. 2014, Hermes Fulfilment Gmbh, Hamburg; 18 pages.

"How to Apply Automation to Your Distribution Center," PeakLogix.com, Oct. 6, 2011; 6 pages.

* cited by examiner

STORE ITEM RETURN PROCESS

RELATED APPLICATIONS

This application claims the benefit of U.S. Provisional Patent No. 62/305,107, filed Mar. 8, 2016, the contents of which are incorporated herein in its entirety.

FIELD

The present inventive concepts relate generally to the return to merchandise purchased at a retail establishment, and more specifically, to systems and methods for transporting returned merchandise from a customer service area to a storage area of a retail establishment.

BACKGROUND

Merchandise purchased at a store may typically be returned to the store in the event that the merchandise was erroneously purchased, damaged, or unsatisfactory to the customer. The conventional return process includes the customer providing the returned merchandise and proof of purchase such as a receipt to a customer service desk.

BRIEF SUMMARY

In one aspect, provided is a system for transporting merchandise returned by a customer from a customer service area or a retail store to a back storage area of a retail store comprises a customer facing device for use by a retail store customer to enter return merchandise data; a scanning device for identifying the returned merchandise; and at least one conveyor belt at the retail store for transporting the returned merchandise from the customer service area to the back storage area.

In some embodiments, the system further comprises a sorting device that receives the returned merchandise from the at least one conveyor belt and sorts the merchandise according to a scanning result of the scanning device.

In some embodiments, the system further comprises a plurality of containers, each accommodating a type of merchandise, a container of the plurality of containers receiving the returned merchandise according to the sorting device.

In some embodiments, the system further comprises a printer for printing a return label that is scanned by the scanning device for identifying the returned merchandise.

In some embodiments, the system further comprises a set of rollers at an end of the at least one conveyor belt for transporting the merchandise from the end of the at least one conveyor belt to the back storage area;

In some embodiments, the customer enters the return merchandise data at the customer facing device at the retail store or a remote location.

In some embodiments, the at least one conveyor belt includes two or three belts, wherein one belt transports the returned merchandise from a register to the second belt and a second belt transports the merchandise from the first belt to the rollers.

In some embodiments, one of the belts is an intermediate belted positioned between a customer service belted segment and storage area belted segment.

In some embodiments, a wall separates the customer service area from the back storage area, and the first belt is on the customer service area side of a wall and the second belt is on the back storage area of the wall.

In some embodiments, the system further comprises at least one guide for maintaining the merchandise on the at least one belt.

In some embodiments, the scanning device includes a barcode scanner or an RFID tag.

In some embodiments, the sorting device is at the end of the at least one belt, and sorts the merchandise into a configurable number of bins for later collection.

In some embodiments, the customer facing device is a kiosk or mobile electronic device having a display.

In one aspect, provided is a method for facilitating both a normal return process and a customer self-service return process, comprising: returning by a customer a store item to a retail store; providing a belted system for transferring the store item from a customer service area of the retail store to a back storage area of the retail store, the belted system comprising: a customer facing device for use by a retail store customer to enter return merchandise data; a scanning device for identifying the returned merchandise; and at least one conveyor belt at the retail store for transporting the returned merchandise from the customer service area to the back storage area.

In some embodiments, the belted system includes an intermediate belted positioned between a customer service belted segment and a storage area belted segment.

In some embodiments, the intermediate belt is flush on a wall adjacent to a desk or counter or attached to the desk or counter.

In some embodiments, the method further comprises sorting the merchandise into a configurable number of bins for later collection at the end of the belted system in the back storage area.

In some embodiments, the return process includes a normal return process and a customer self-service return process.

In another aspect, a store merchandise returns system, comprises at least one first conveyor at a customer service area of a store; at least one second conveyor at a storage area of the store; and an intermediate belt between the first conveyor and the second conveyor customer service belted segment and the storage area belted segment for transporting returned merchandise from the customer service area to the storage area.

BRIEF DESCRIPTION OF THE SEVERAL VIEWS OF THE DRAWINGS

The above and further advantages may be better understood by referring to the following description in conjunction with the accompanying drawings, in which like numerals indicate like structural elements and features in various figures. The drawings are not necessarily to scale, emphasis instead being placed upon illustrating the principles of the concepts.

DETAILED DESCRIPTION

Embodiments of the present invention will now be described more fully hereinafter with reference to the accompanying drawings, in which preferred embodiments of the invention are shown. This invention may, however, be embodied in different forms and should not be construed as limited to the embodiments set forth herein. Like numbers refer to like elements throughout the specification.

Embodiments include systems and methods for facilitating the hands-free transport of returned store merchandise from a customer service desk or other point of receipt of returned merchandise to a storage or inventory location in the store, and ensuring the safekeeping of the returned merchandise for future resale. For example, the merchandise is immediately returned to the storage room automatically whereby a transport structure is constructed and arranged to prevent handling-related damage at the desk. This is a known issue for the conventional process.

The systems and methods in some embodiments may facilitate both a normal return process and a customer self-service return process, resulting in improved customer satisfaction.

A feature here is that when a customer returns a purchase store item, the customer service representative receiving the returned item at the customer service desk does not have to leave the area where the exchange took place, i.e., the customer service representative does not need to personally carry the returned item back to the storage area. Instead, a belted system is provided so that the returns are transported from the customer service front area to the storage area.

Figure 1:
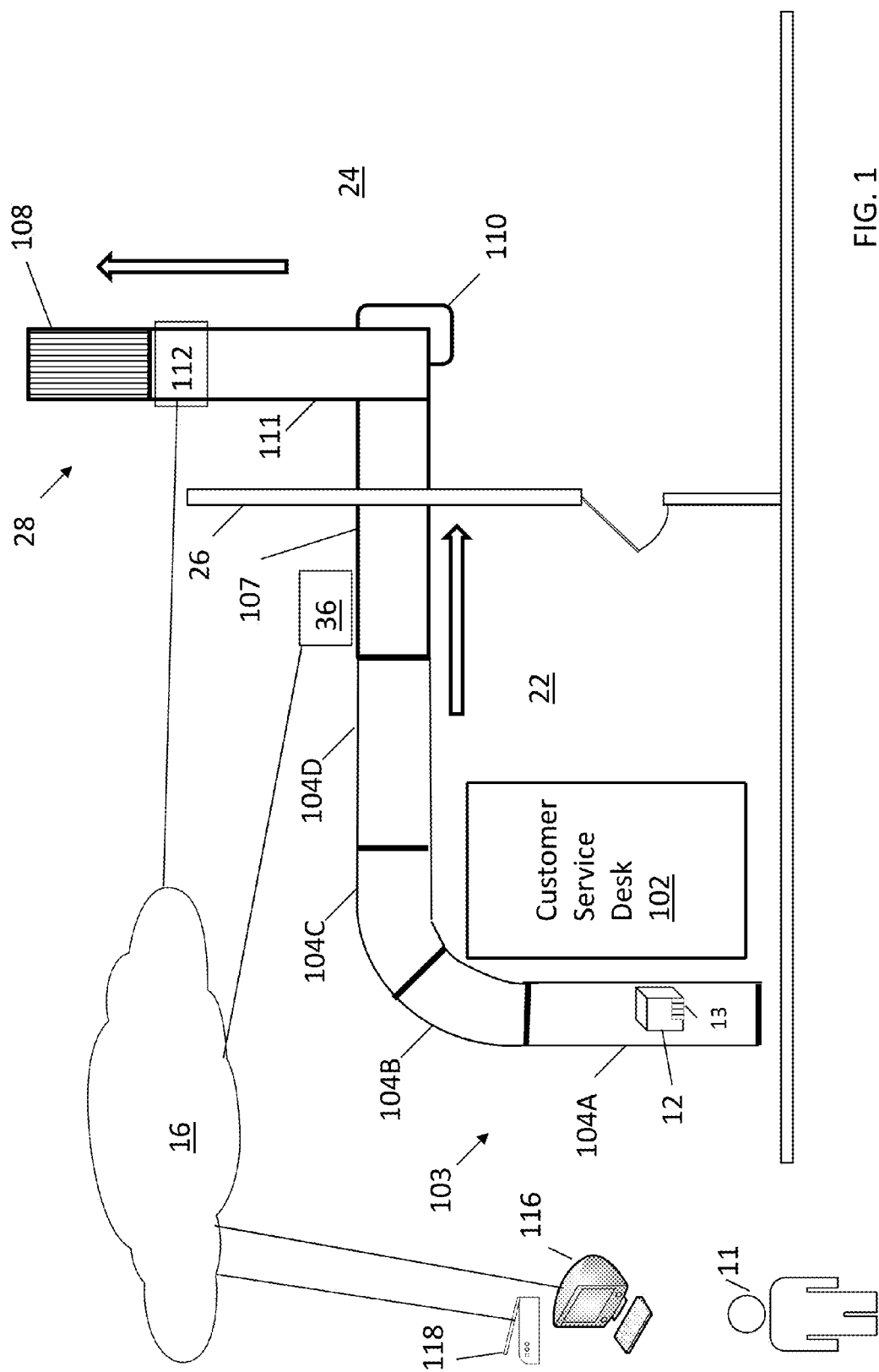
FIG. 1 is a floor diagram of a retail establishment in which embodiments can be practiced.

FIG. 1 is a floor diagram of a retail establishment in which embodiments can be practiced.

The retail establishment may be a grocery store, department store, brick-and-mortar facility, and the like. The retail establishment includes a customer service area 22 and a storage area 24. The customer service area 22 may include a customer service desk 102 and/or other apparatus for receiving returned store merchandise 12.

The retail establishment includes a returns system that allows for quick, hands-free transport of returned merchandise from a customer service desk 102 at a customer service area 22 to a storage area 24 of the retail establishment typically located at the back of the store, but not limited thereto. The returns system may include a first conveyor 103, which may include one or more belted segments 104A-104D (generally, 104). Some or all of the first conveyor 103 may be co-located with, adjacent to, or proximal to the customer service desk 102 at the customer service area 22.

The conveyor belts of the belted segments 104 are constructed and arranged to transport store items from the customer service desk 102 to other areas in the retail establishment, and include well-known components for performing this function, including but not limited to motors, sensors, guides, rollers, actuators, switches, computer processors, and so on.

At least one other belted segment 111 may be located at the storage area 24. An intermediate belted segment 107 may be positioned between the customer service belted segment 103 and the storage area belted segment 111. In some embodiments, a combination of the belted segments 104 of the first conveyor 103, the intermediate belted segment 107, or intake belt, and the storage area belted segment 111 may be referred to as a conveyor system. In other embodiments, a conveyor system consists of only the intermediate belted segment 107 and the storage area belted segment 111. In other embodiments, additional transition belts are included, depending on the store layout, for example, a belt for transporting merchandise around a corner at the store.

Figure 2:
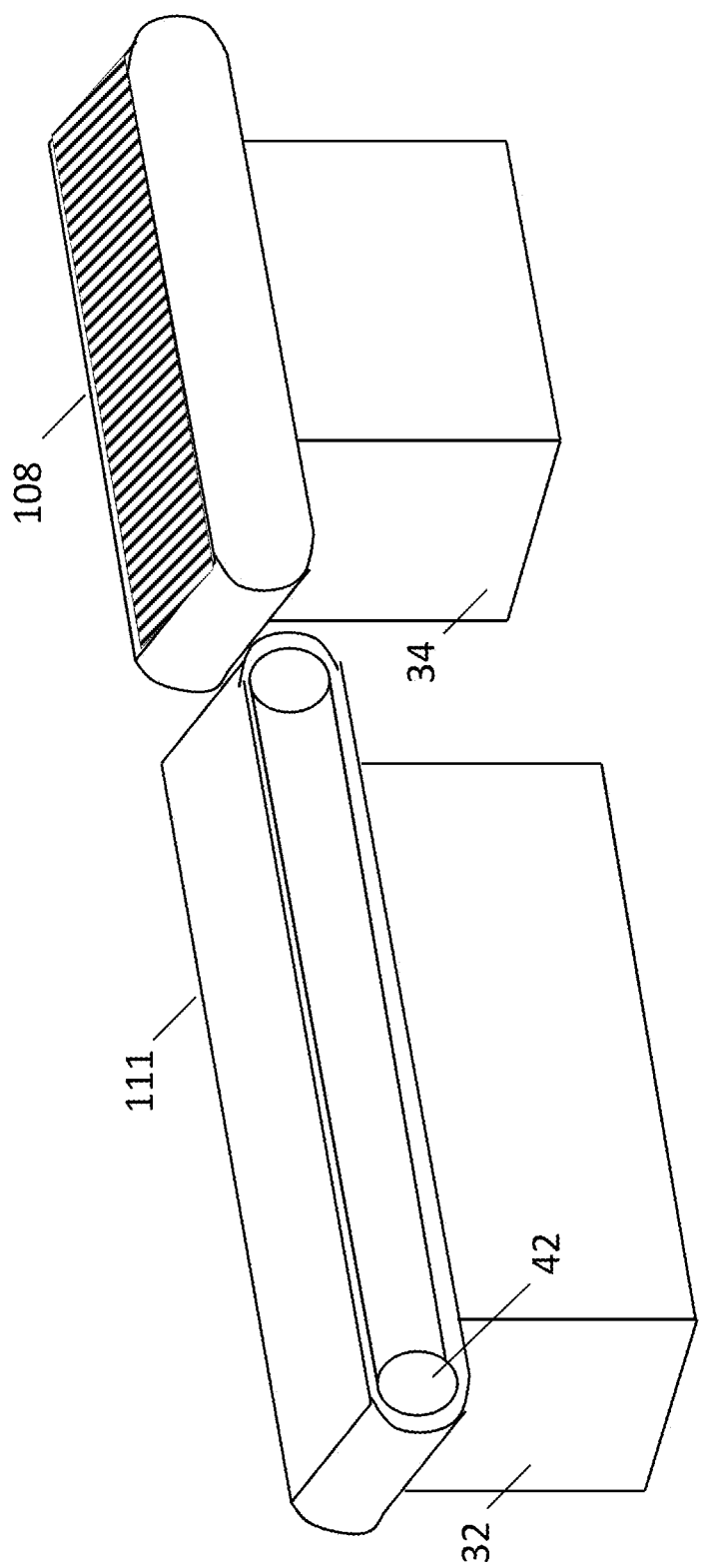
FIG. 2 is a perspective view of a customer service returns belt segment, in accordance with some embodiments.

One or more of the belted segments 103, 107, 111 may be positioned on a counter 32, for example, shown at FIG. 2. The rollers 108 may also be positioned on a counter 34. The counters on which the belted segments 103, 107, 111 are positioned preferably have a same height so that the belted segments 103, 107, 111 extend along a same linear axis. A counter 32 may include rollers 42 and/or other well-known components for generating a conveying motion of the belted segments, such as a motor, sensors, guides, rollers, actuators, switches, computer processors, and so on.

A customer facing electronic device 116 (e.g., a kiosk, smartphone, other electronic device having a display) may be at customer service area 22 for use by a retail store customer and/or store associate to enter return merchandise data. The customer facing electronic device 116 may include a processor, memory, input/output, peripheral devices, such as a display, keyboard, mouse, or may be an interactive device where users may enter information via the display. The customer facing device 116 may communicate with a store computer via a network 16 for processing the return merchandise data. The belts may be activated when merchandise return data (barcode, sales slip, etc.) is processed. The belts may be stationary, then activated based on returns data being processed.

A scanning device 118 may be provided for identifying the returned merchandise, for example, scanning a barcode label 13 or QR code on the returned item 12 or its packaging. Another scanner 112 may be positioned at the end of belt 111, in front of rollers 108.

The retail establishment may include a wall 26 or other divider or partitioning element that provides a physical separation between the customer service area 22 and the back storage area 24. In other embodiments, no physical barrier is present between the customer service area 22 and the back storage area 24. The back storage area 24 may include an inventory of store items. The returned merchandise may be returned to the inventory after verifying that the materials are returned properly, i.e., no damage, fraudulent returns, and so on.

The transition region 200 may include a belted system of the conveyor system that includes a first belt 107 (also referred to as an intake belt) and a second belt 111 (also referred to as a post-intake belt). The first belt 107 from the customer service area 22 to the back storage area 24, for example, through an opening in the wall 26. The second belt 111 may extend from the first belt 107 to a set of rollers 108. The first belt 107 and second belt 111 may be perpendicular or tangential to each other, or arranged in a different manner so long as the belts conform with store layout requirements. One or more guides 110 may be positioned at the corner of the first belt 107 and the second belt 111 for ensuring that items remain on the belts 107, 111 during movement. An actuator device 36 may be present for activating or shutting off some or all of the belts 104, 107, 111. The actuator 36 would scan the printed barcode attached to the return merchandise. This is to confirm the item on the belt is a return. When the scan is accepted, the belt is activated and the item can be carried to the rear storage area/sorter 28

Various elements of the retail establishment may communicate with each other and/or external electronic devices such as a remote computers, servers, storage devices, mobile electronic devices by a communications network 16. The store may include well-known devices for performing such electronic communication including routers, switches, WiFi devices, computer servers, and so on. The network 16 may be a public switched telephone network (PSTN), a mobile communications network, a data network, such as a local area network (LAN) or wide area network (WAN), or a combination thereof, or other communication network known to those of ordinary skill in the art.

Figure 3:
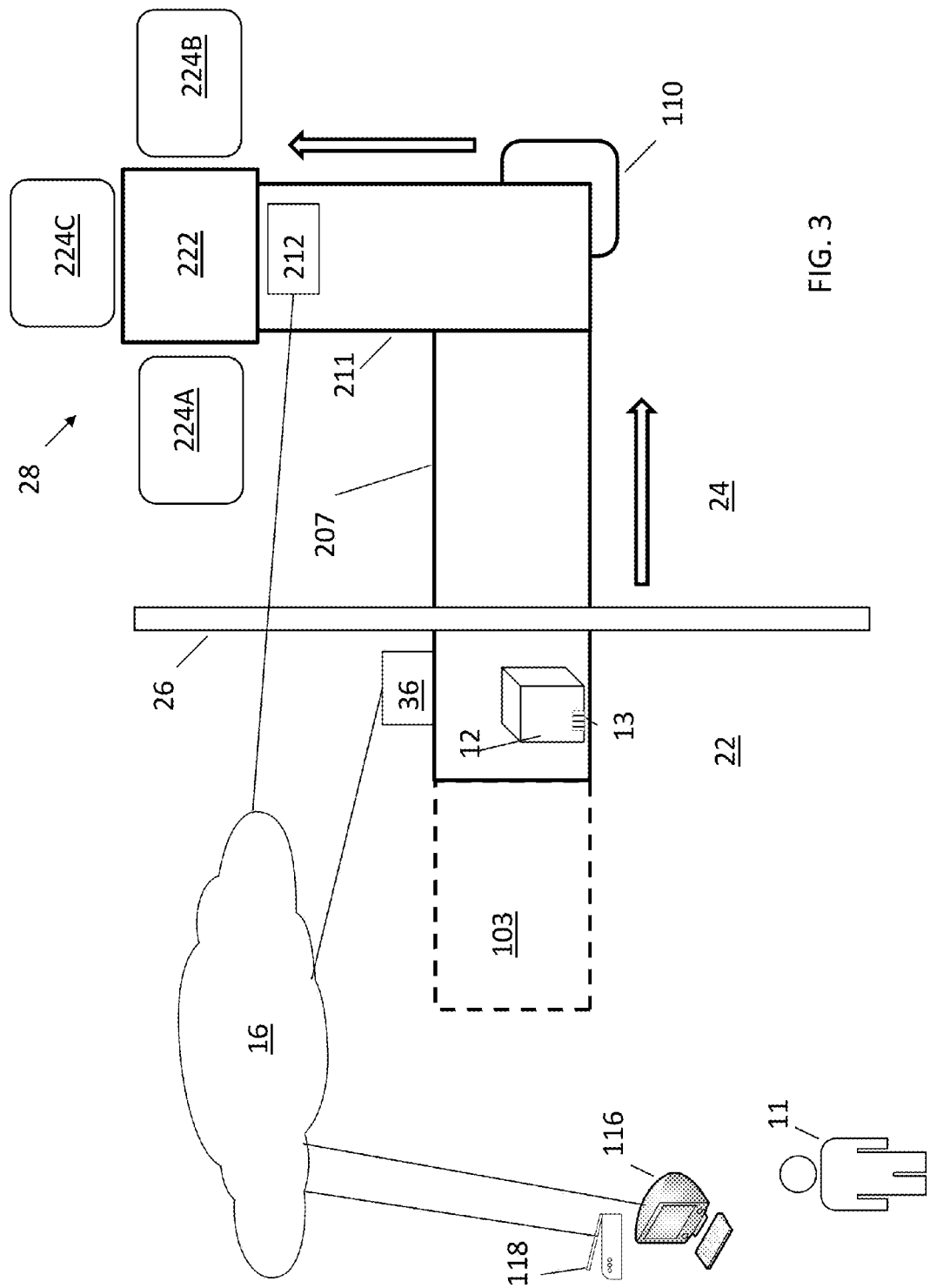
FIG. 3 is an enlarged view of a region of the retail establishment of FIG. 1 at which a hands-free transport of returned merchandise from a customer service area to a back storage area is performed, in accordance with other embodiments.

FIG. 3 is an enlarged view of a region of the retail establishment of FIG. 1 at which a hands-free transport of returned merchandise from a customer service area 22 to a back storage area 24 is performed, in accordance with other embodiments.

The retail establishment in FIG. 3 includes a plurality of belted segments similar to or the same as belted segments 104, 107, 111 illustrated in FIGS. 1 and 2. In particular, an intermediate belted segment 207 may receive returned merchandise from one or more customer service belt segments (not shown) and transfer them to a storage area belted segment 211. Due to the similarities, details on the belted segments 207 and 211 are not repeated due to brevity.

At the end of the storage area belted segment 211 may be positioned a sorter 222 and one or more collection bins 224A-224C (generally, 224), or related containers. A scanner 212 may be positioned in front of the sorter 222. The scanner 212 is positioned for scanning a label, barcode, QR code, or the like for identifying the returned store merchandise item 12 on the returns system. The sorter 222 can divert the merchandise 12 in response to a scan of the label on the merchandise performed by the label scanner 212 and by way of a diverter belt or arm being raised to redirect the diverted merchandise in a desired direction. The collection bins 224 are each identified for allocating a type of merchandise. For example, collection bin 224A may be positioned relative to the sorter 222 for receiving clothing-related returns, while collection bin 224B may be positioned opposite the sorter from collection bin 224A for receiving electronics-related returns. In another example, returned items are sorted into dispositions, for example, categorized by items eligible for resale, damaged items, online purchase returns, and so on. The container bins 224 are movable so that a store associate can transfer returned goods categorized by the sorter to a storage location for future sale.

Figure 4:
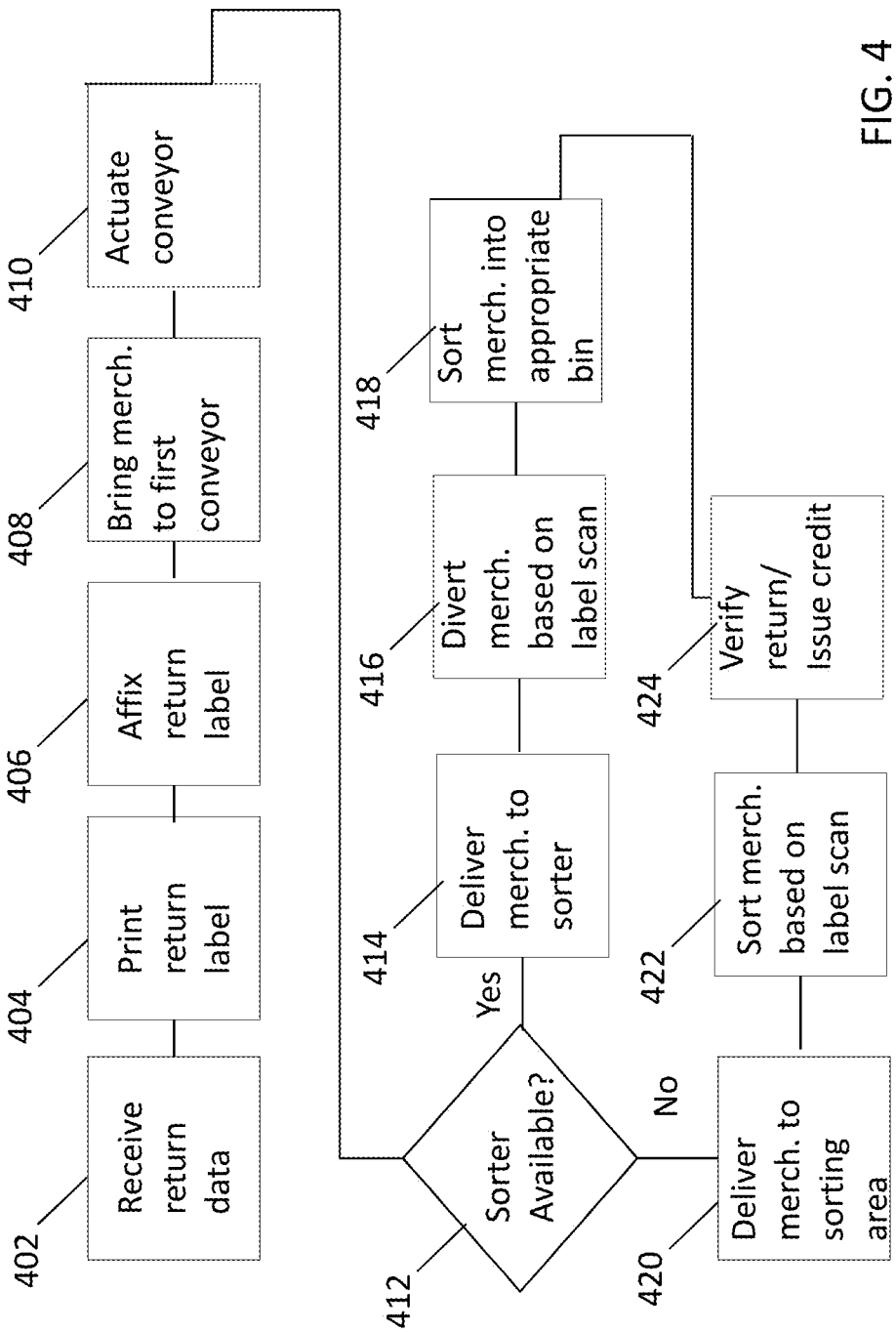
FIG. 4 is a flow diagram of a method for processing returned store merchandise, in accordance with some embodiments.

FIG. 4 is a flow diagram of a method 400 for processing returned store merchandise, in accordance with some embodiments. In describing the method 400, reference is made to elements of FIGS. 1-3. Some or all of the method 400 may be performed by elements of the environment described and illustrated with respect to FIGS. 1-3.

At block 402, a customer 11 interacts with a customer facing device 116. Here, the customer 11 may enter return data, such as receipt number, universal product code (UPC), reasons for returning merchandise, which is received, stored at a memory device, and processed by one or more computer processors of the customer facing device 116. The foregoing and/or other data may be retrieved by scanning a label 13 such a barcode or QR code on the returned item or package holding the returned item. The item 12 may be scanned by a scanner 118 at the customer service desk 102, and/or by a scanner 112 at the end of the belts. In applications including a sorter 222, either the scanner or scanner 212 may be used for processing returned items according their scanned result at either the customer service desk (scanner 118) or belt (scanner 212).

At block 404, the customer facing device 116 may include a printer that prints a return label 13 based on the information presented in block 402. At block 406, the return label 13 is affixed to the returned merchandise.

At block 408, the customer 11 or other person, vehicle, or other transport mechanism transfers the returned merchandise 12 having the affixed return label 13 to a first conveyor 103, which may include one or more belted segments 104A-104D (generally, 104).

At block 410, the first conveyor 103 is actuated, for example, by a computer sending a signal to an actuator 36. The actuator 36 would scan the printed barcode attached to the return merchandise. This is to confirm the item on the belt 103 is a return. When the scan is accepted, the belt 103 is activated and the item can be carried to the rear storage area/sorter. As described above, the actuator 36 may be activated by a valid return label scan. The belts would carry items to the storage area or sorter. In some embodiments, the other belts 107, 111 of the conveyor system are actuated in concert with the first conveyor 103, or actuated independently of the first conveyor 103. In some embodiments, only the intake belt 107 is required at the desk. In other embodiments, multiple customer devices may be used and a signal intake belt 107 activated by the scanner for depositing returns. In other embodiments, the belt is flush on a wall adjacent to a desk or counter 32 instead of being attached to the desk or counter 32. In other embodiments, one or more conveyors 104, 107, 111 may be actuated by weight/photo eye/scan, or the like. Here, there may be a need to prevent activation of the intake belt in the event of a jam, a full belt or sorting bin. The photo eyes or the like would be able to detect the presence of items on the post-intake belt 111 and prevent activation of the intake belt 107.

At decision diamond 412, a determination is made whether the returns system includes a sorter, for example, similar to sorter described with reference to FIG. 3. If a determination is made that the system includes a sorter, then at block 414, the conveyor system delivers items to the sorter 222.

At block 416, the sorter 222 diverts merchandise in response to a scan of the label on the merchandise performed by the label scanner 212. The label scanner 212 can be located at or near the sorter 222, in front of the bins 224, or at the customer desk, for example, similar to scanner 118 shown in FIG. 1.

At block 418, the scanned and sorted merchandise is sorted into appropriate bins 224. Sorting process may be determined based on one or more factors, such as the use of an identifier such as a UPC, or whether the item was purchased in the store or an e-commerce online purchase, return reason code, such as the returned item is damaged, customer changed mind, and so on.

At block 424, the returned merchandise is verified. A verification process may include manual steps where an associate may scan the attached barcode for each item, verify a match and the disposition of the item (damaged or not) and not damaged, the associate can approve the return. A credit issued to the customer after the returned merchandise is verified.

Returning to decision diamond 412, if a determination is made that the system does not include a sorter, then the method 400 proceeds to block 420, where the returns system delivers the items to a sorting area 28, for example, shown in FIG. 1. At block 422, the items in the sorting area 28 can be sorted in response to a label scan. At block 424, the returned merchandise is verified. A credit issued to the customer after the returned merchandise is verified.

As will be appreciated by one skilled in the art, aspects of the inventive concepts may be embodied as a system, method, or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire-line, optical fiber cable, radio frequency, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

While concepts have been shown and described with reference to specific preferred embodiments, it should be understood by those skilled in the art that various changes in form and detail may be made therein without departing from the spirit and scope as defined by the following claims.

What is claimed is:

1. A system for transporting merchandise returned by a customer from a customer service area of a retail store to a back storage area of a retail store, comprising:
   a customer facing device at the customer service area for use by a retail store customer to enter return merchandise data;
   a scanning device external to and physically separate from the customer facing device for identifying the returned merchandise;
   at least one conveyor belt at the retail store external to and physically separate from both the customer facing device and scanning device, and having a surface on which the returned merchandise is positioned for transporting the returned merchandise from the customer service area to the back storage area where the returned merchandise is stored, wherein an outermost end of the at least one conveyor belt is in the back storage area, wherein the at least one conveyor belt comprises:
   a first belt including at least one customer service belted segment that transports the returned merchandise from a register to a second belt;
   the second belt including an intermediate belted segment positioned between the customer service belted segment and a third belt;
   the third belt including a storage area belted segment; and
   a set of rollers on a counter separate from the third belt at the outermost end, wherein the rollers and the storage area belted segment are co-located in the back storage area for receiving the returned merchandise from the intermediate belted segment.

2. The system of claim 1, further comprising a sorting device that receives the returned merchandise from the at least one conveyor belt and sorts the merchandise according to a scanning result of the scanning device.

3. The system of claim 2, further comprising a plurality of containers, each accommodating a type of merchandise, a container of the plurality of containers receiving the returned merchandise according to the sorting device.

4. The system of claim 2, wherein the sorting device sorts the merchandise into a configurable number of bins for later collection.

5. The system of claim 1, further comprising a printer for printing a return label that is scanned by the scanning device for identifying the returned merchandise.

6. The system of claim 1, wherein the customer enters the return merchandise data at the customer facing device at the retail store or a remote location.

7. The system of claim 1, wherein a wall separates the customer service area from the back storage area, a first belt of the at least one conveyor belt is on the customer service area side of a wall, and a second belt of the at least one conveyor belt is on the back storage area of the wall.

8. The system of claim 1, further including at least one guide for maintaining the merchandise on the at least one conveyor belt.

9. The system of claim 1, wherein the scanning device includes a barcode scanner or an RFID tag.

10. The system of claim 1, wherein the customer facing device is a kiosk or mobile electronic device having a display.

11. A method for facilitating a store item return process, comprising:
   returning a store item at a customer service area of a retail store; and
   providing a belted system having a surface on which the returned store item is positioned for transferring the store item from the customer service area of the retail store to a back storage area of the retail store, the belted system comprising:
      a customer facing device at the customer service area for use by a user to enter return merchandise data including the store item;
      a scanning device external to and physically separate from the customer facing device for identifying the returned merchandise; and
   at least one conveyor belt of the belted system at the retail store external to and physically separate from both the customer facing device and scanning device for transporting the returned merchandise from the customer service area to the back storage area where the returned merchandise is stored, wherein an outermost end of the at least one conveyor belt is in the back storage area, wherein the at least one conveyor belt comprises:
   a first belt including at least one customer service belted segment that transports the returned merchandise from a region proximal the customer facing device to a second belt;
   the second belt including an intermediate belted segment positioned between the customer service belted segment and a third belt;
   the third belt including a storage area belted segment; and
   a set of rollers on a counter separate from the third belt at the outermost end, wherein the rollers and the storage area belted segment are co-located in the back storage area for receiving the returned merchandise from the intermediate belted segment.

12. The method of claim 11, wherein the intermediate belt is flush on a wall adjacent to a desk or counter or attached to the desk or counter.

13. The method of claim 11, further comprising sorting the merchandise into a configurable number of bins for later collection at the end of the belted system in the back storage area.

14. The method of claim 11, wherein the return process includes a return process including a customer service representative and a customer self-service return process.

15. A store merchandise returns system, comprising:
   at least one first conveyor proximal a customer facing device at a customer service area of a store for receiving returned merchandise processed by the customer facing device;
   at least one second conveyor at a storage area of the store;
   an intermediate belt between the at least one first conveyor and the second conveyor, the at least one first conveyor comprising a customer service belted segment and the at least one second conveyor comprising a storage area belted segment for transporting the returned merchandise from the customer service area to the storage area;
   a sorting device at an end of the at least one second conveyor that sorts previously unsorted returned merchandise into a configurable number of bins for later collection at the end of the at least one second conveyor in the storage area; and
   a scanning device proximal the sorting device for identifying the returned merchandise, the sorting device diverting the returned merchandise in response to a scan of a label on the returned merchandise performed by the scanning device.

* * * * *